United States Patent [19]

White

[11] 4,158,460

[45] Jun. 19, 1979

[54] ROLL BAR SAFETY FRAME FOR A TRACTOR

[75] Inventor: Malcolm White, Long Marston, near York, England

[73] Assignee: Susan Beck White, near York, England

[21] Appl. No.: 831,261

[22] Filed: Sep. 7, 1977

[30] Foreign Application Priority Data

Feb. 2, 1977 [GB] United Kingdom ............... 4342/77

[51] Int. Cl.² ............................................. B62D 25/06
[52] U.S. Cl. .................................... 280/756; 296/102; 403/3; 403/262
[58] Field of Search ............... 280/756; 296/102, 107; 403/3, 262, 234

[56] References Cited

U.S. PATENT DOCUMENTS

3,656,803  4/1972  Brown et al. .................... 296/102

FOREIGN PATENT DOCUMENTS

2510909  4/1976  Fed. Rep. of Germany ........... 296/102

Primary Examiner—Robert R. Song
Attorney, Agent, or Firm—Armstrong, Nikaido, Marmelstein & Kubovcik

[57] ABSTRACT

A rollbar safety frame for an agricultural or industrial tractor comprises two uprights joined at their upper ends by a cross-member, and is adjustable so that it may fit different types of tractor. The frame is adjustable at its upper end, its lower end, or both. For adjustment at the upper end, the cross member is securable between the uprights such that the distance therebetween is adjustable. For adjustment at the lower end, each upright carries a securing plate provided with means for adjusting the relative positions of securing bolts transversely of an axle about which the uprights are secured. The safety frame may, if desired, be hinged at a central portion such that, when secured to a tractor, it may be folded.

9 Claims, 4 Drawing Figures

ROLL BAR SAFETY FRAME FOR A TRACTOR

This invention relates to roll over safety frames intended primarily for use with agricultural and industrial tractors.

In order to protect the driver of a tractor in the event of a tractor rolling over, it is known to provide a safety frame comprising two uprights and a cross-member. The uprights are usually secured to the tractor around the rear axle, and the cross-member is located generally above the driver's head.

Because of the many different types and models of tractors, any one safety frame usually will fit only one model of tractor. This is evidently disadvantageous from the point of view of cost, and also insofar as a tractor owner may not readily be able to obtain a safety frame to fit his tractor.

The present invention is concerned with the provision of a safety frame which is improved in the foregoing respect, insofar as it may be fitted to different models of tractors.

According to a first aspect of the present invention, there is provided a safety frame for an agricultural or industrial tractor, the frame comprising two uprights adapted to be fitted at their lower ends about the rear axle of a tractor, a cross member, and securing means for securing the cross member between the upper ends of the uprights such that the distance between said upper ends is adjustable.

Thus, the safety frame may be fitted to tractors of different widths and/or of different rear axle configurations.

According to a second aspect, the present invention provides a safety frame for an agricultural or industrial tractor, the frame comprising two uprights adapted to be fitted at their lower ends about the rear axle of a tractor, and a cross member which is secured or is securable between the upper ends of the uprights, each upright being provided at its lower end with a securing plate which is adapted to carry bolts for securing the upright about said rear axle and is provided with means for adjusting the relative positions of the bolts transversely of said axle.

Thus, the safety frame may be fitted to tractors having rear axles of different dimensions.

For a better understanding of the invention and to show how the same may be carried into effect, reference will now be made, by way of example, to the accompanying drawings, in which:

FIGS. 5 and 6 illustrate alternate embodiments of the safety frame of the present invention.

Figures 1, 2:
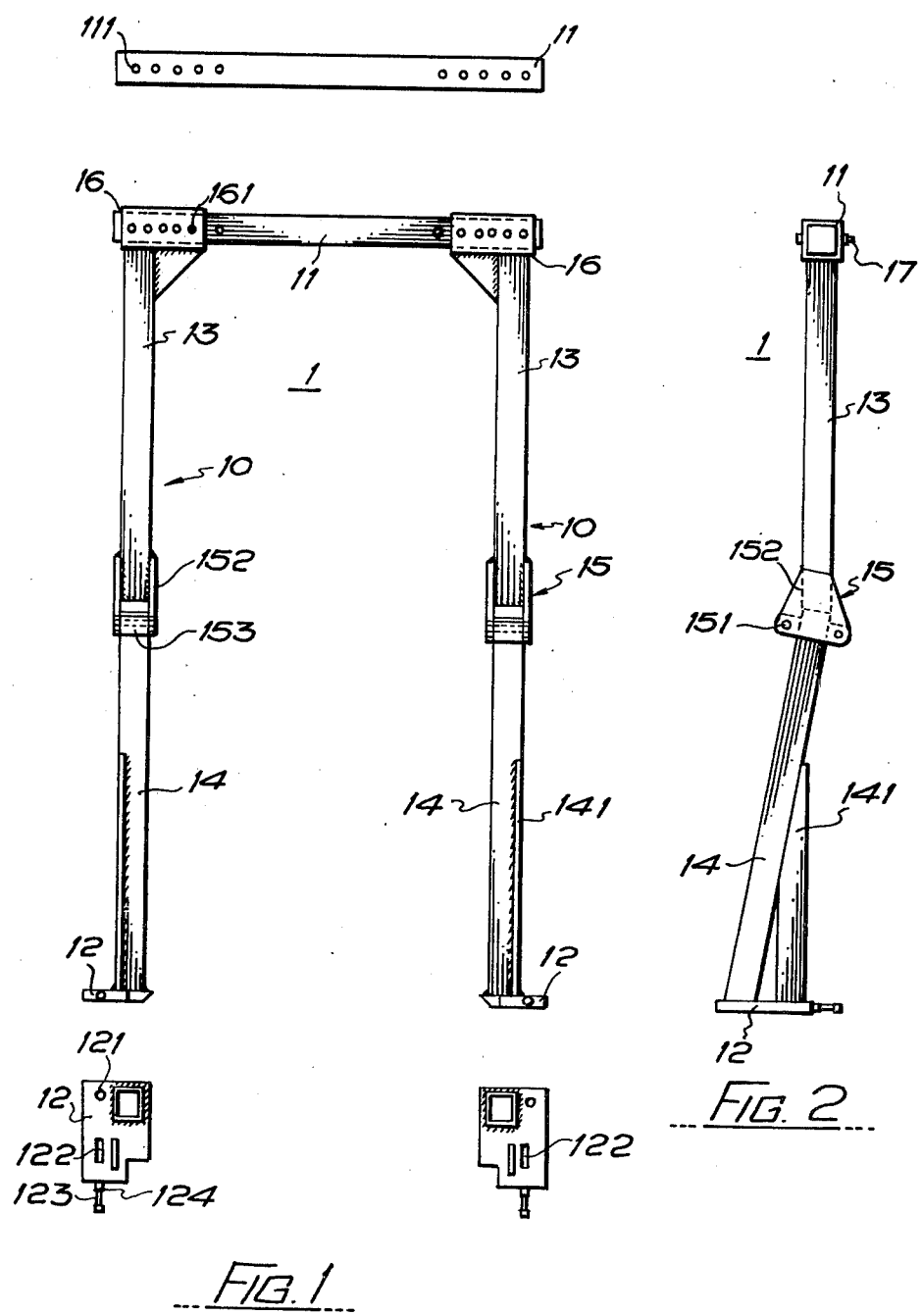
FIG. 1 is a rear elevation of a safety frame in accordance with the invention.
FIG. 2 is a side elevation of the safety frame.

The illustrated safety frame 1 comprises two uprights 10 and a cross member 11 which is securable between the upper ends of the uprights 10. At the upper end of each upright 10 is provided a portion 16 of rectangular hollow section which is provided with a succession of five pairs of aligned holes 161, spaced at 30 mm intervals. The cross member 11, also of rectangular hollow section, is formed at each end with a succession of five pairs of aligned holes 111, spaced at 50 mm intervals. The cross member 11 slidably engages in the portions 16, and is secured thereto by securing bolts 17 which pass through the holes 111 and 161. It will be appreciated that the distance between the upper ends of the uprights 10 may be adjusted by sliding the cross member 11 in the portion 16, and passing the bolts 17 through different selected holes 111 and 161.

Figure 3:
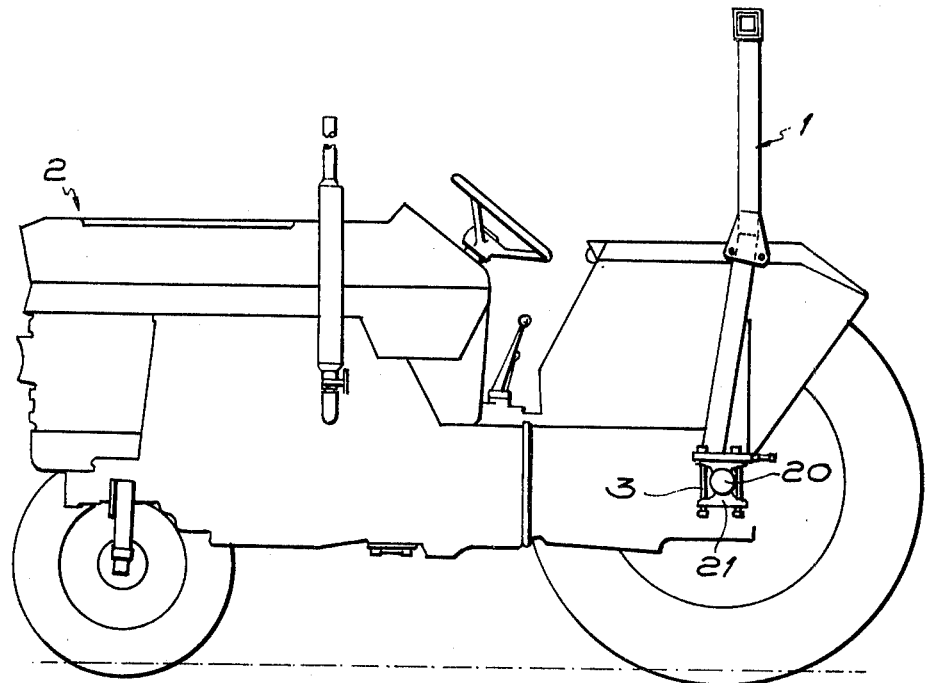
FIGS. 3 and 4 are respective side and rear elevations of the safety frame when fitted to a tractor.
Figure 4:
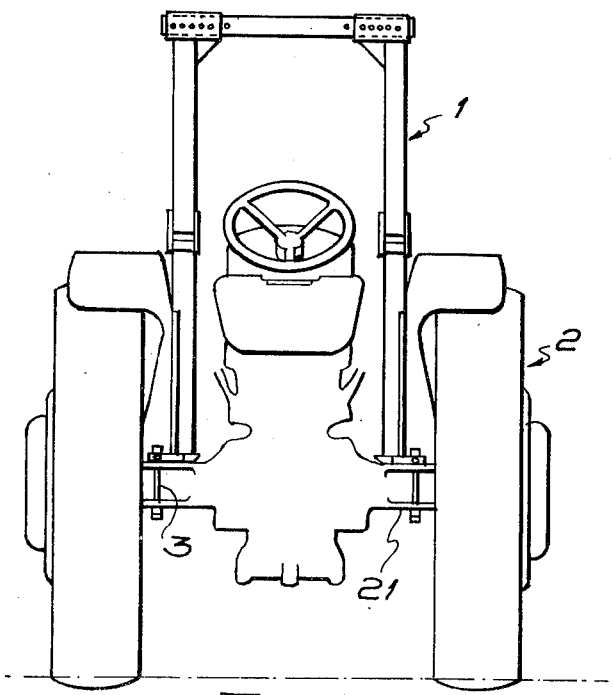

Each upright 10 is provided at its lower end with a securing plate 12 which is adapted to carry bolts 3 for securing the upright 10 about the rear axle 20 of the tractor 2 (see FIGS. 3 and 4). To this end, each plate 12 is provided with a hole 121 for the passage therethrough of a securing bolt 3, and with a slot 122 for the passage therethrough of another securing bolt 3. The provision of the slot 122 enables the position of the bolt 3 therein to be adjusted relative to that of the bolt 3 in the hole 121 (i.e. in a direction transversely of the axle 20). A bolt 123 engages a threaded hole which is formed in the base plate 12 and communicates with the slot 122, such that the bolt 123 can be screwed into and out of the slot 122. A locking nut 124 is provided for the bolt 123. Thus, the bolt 123 arrangement provides screw-adjustable abutment means which serves to limit the outward position of the respective bolt 3 in the slot 122 in use of the safety frame 1.

Referring to FIGS. 3 and 4, the bolts 3 pass through respective holes formed in the axle housing 21, to secure the uprights 10 about the axle 20. As the relative positions of the screws 3 can be adjusted, the frame may be clamped to axle assemblies of different widths. Instead of providing holes in the axle housing 21, the bolts 3 may instead closely abut the outside edges of the housing 21, (possibly with the provision of a further plate such as 12 underneath the axle housing 21), in which arrangement the provision of the adjusting bolts 123 is particularly useful.

Each upright 10 comprises an upper portion 13 and a lower portion 14 which is reinforced with a member 141. Each upright 10 is hinged at a central portion 15, where hinge pins 151 which are provided with lynch pins pass through flanges 152 welded to the upper portion 13, and blocks 153 welded to the lower portion 14. Upon removal of a hinge pin 151 from each upright 10, the safety frame 1 may be folded. This is of course useful where a tractor has to pass under a low obstruction, for example, in a large greenhouse, where the frame 1 may be quickly folded and then reassembled. Any suitable alternative hinge arrangement may be employed.

As an alternative to a hinge arrangement, each upper portion 13 may be detachable from the respective lower portion 14, for example in a spigot-and-socket manner, such that an upper portion of the frame 1 may be temporarily detached from the remaining lower portion. The upper and lower portions 13 and 14 may normally be secured together by means of hinge and lynch pins, or any other suitable quick-release arrangement.

The cross member 11 and uprights 10 may be provided with any other suitable arrangement for providing adjustment of the distance between the upper ends of the uprights 10. For example, as shown in FIG. 5, the cross member 11 may be provided at its opposite ends with screw threads 50 of opposite hand, which engage complementary screw threads in the portions 16. Adjustment of the spacing of the uprights 10 is then obtained by rotating the cross member 11. The threaded portions 50 at the ends of the cross member 11 need not be of opposite hand, in which case adjustment of the distance between the uprights 10 may be obtained by rotating one of the uprights 10. In an alternative arrangement, a clamping means may be provided for securing the cross member 11 to at least one of the uprights 10 such that upon slackening the clamping means, the cross member 11 and the respective upright 10 are relatively slidable for the adjustment of the distance between the uprights 10. A suitable clamping means may be of the type commonly employed in scaffolding, where, as shown in FIG. 6, two generally U-shaped members 60 engage about the cross-member 11, and tightening nuts are provided for clamping the U-shaped members about the cross-member, the U-shaped members 60 engaging retaining brackets 61 welded to the upper ends of the uprights 10.

Any other suitable means may be provided for adjusting the relative positions of the bolt 3 in each of the plates 12.

Although the safety frame is intended primarily for use with agricultural and industrial tractors, it will be appreciated that it may have other applications.

Instead of rectangular hollow section members, circular hollow section (or any other suitable section) may be used for the frame 1, which is substantially all of steel.

One particular advantage of the illustrated frame 1 is that it may be packed and shipped in a collapsed state, requiring relatively little space, and readily assembled by the purchaser.

A frame such as that illustrated has successfully completed the test laid down by the British Standards Institution (BS 4063—April 1973), and has also been tested to OACD standard.

I claim:

1. A safety frame for an agricultural or industrial tractor, the frame comprising two uprights adapted to be secured at their lower ends to the rear axle housing of a tractor, and a cross member which is secured or is securable between the upper ends of the uprights, each upright being provided at its lower end with a securing plate which is adapted to receive bolts for securing the upright to said rear axle housing and is provided with adjusting means for adjusting the relative positions of the bolts transversely of said axle, wherein said adjusting means comprises a bolt-receiving slot which extends transversely of said axle in use of the frame, and screw-adjustable abutment means which serves to limit the outward position of the bolt in said slot in use of the frame.

2. A safety frame according to claim 1, comprising securing means for securing the cross member between the upper ends of the uprights such that the distance between said upper ends is adjustable.

3. A safety frame according to claim 2, wherein said securing means comprises a securing bolt and, in at least one of the cross member and the uprights, a portion formed with a succession of holes each for the passage therethrough of said bolt, such that adjustment of said distance can be effected.

4. A safety frame according to claim 2, wherein said securing means comprises, on the cross member and the uprights, respective screw-threaded portions for threaded engagement with one another, whereby adjustment of said distance can be effected by relative rotation between the cross member and at least one of the uprights.

5. A safety frame according to claim 4, wherein opposite ends of the cross member are formed with screw-threads of opposite hand.

6. A safety frame according to claim 2, wherein said securing means comprises clamping means for securing the cross member to at least one of the uprights such that, upon slackening the clamping means, the cross member and said at least one upright are relatively slidable for the adjustment of said distance.

7. A safety frame according to claim 3, wherein each upright is hinged at a central portion such that, when secured to a tractor, the frame may be folded.

8. A safety frame according to claim 3, wherein each upright is in two detactable parts such that, when the frame is secured to a tractor, an upper portion of the frame may be detached from the remaining lower portion.

9. An agricultural or industrial tractor provided with a safety frame according to claim 7.

* * * * *

UNITED STATES PATENT AND TRADEMARK OFFICE
CERTIFICATE OF CORRECTION

PATENT NO. : 4,158,460
DATED : June 19, 1979
INVENTOR(S) : MALCOLM WHITE

It is certified that error appears in the above-identified patent and that said Letters Patent are hereby corrected as shown below:

On the cover page, Item [57], change "9 Claims, 4 Drawing Figures" to --- 9 Claims, 6 Drawing Figures ---.

The sheet of drawings containing Figures 5 and 6 should be included in the Letters Patent. (SEE ATTACHMENT).

Signed and Sealed this

Thirtieth Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,158,460
DATED : June 19, 1979
INVENTOR(S) : MALCOLM WHITE

It is certified that error appears in the above-identified patent and that said Letters Patent are hereby corrected as shown below:

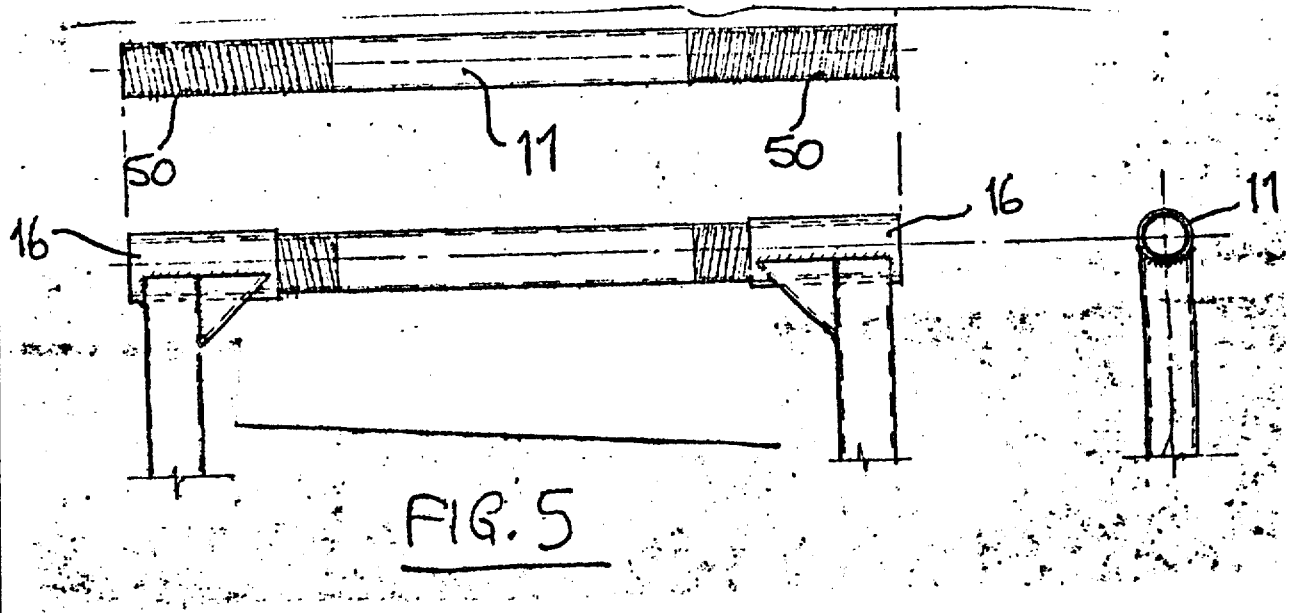

FIG. 5

UNITED STATES PATENT AND TRADEMARK OFFICE
CERTIFICATE OF CORRECTION

PATENT NO. : 4,158,460

DATED : June 19, 1979

INVENTOR(S) : MALCOLM WHITE

Page 3 of 3

It is certified that error appears in the above-identified patent and that said Letters Patent are hereby corrected as shown below:

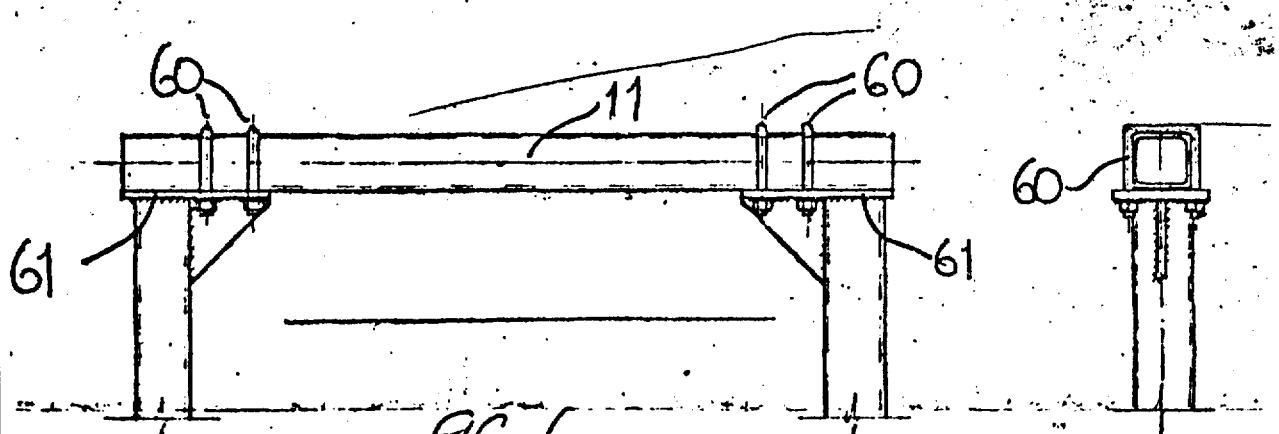

FIG. 6